United States Patent [19]

Cooper, Jr.

[11] 4,011,726

[45] Mar. 15, 1977

[54] DELTA CULVERT

[75] Inventor: Glenn A. Cooper, Jr., Springfield, Va.

[73] Assignee: The United States of America as represented by the Secretary of Agriculture, Washington, D.C.

[22] Filed: Nov. 5, 1975

[21] Appl. No.: 629,477

[52] U.S. Cl. .................................. 61/16; 52/284; 138/155; 138/177; 403/382

[51] Int. Cl.² ...................... E02B 11/00; F16L 9/22

[58] Field of Search ............ 61/16, 14; 52/284, 90, 52/233, 92, 753 D, 753 T; 46/28; 138/155, 177; 403/382, 378

[56] References Cited

UNITED STATES PATENTS

| 445,994 | 2/1891 | Harris | 61/16 |
|---|---|---|---|
| 903,572 | 11/1908 | Houghton | 61/16 |
| 1,779,325 | 10/1930 | Manning | 52/92 |
| 2,359,450 | 10/1944 | Spaulding et al. | 138/155 |
| 2,657,713 | 11/1953 | Jensen | 138/155 |

*Primary Examiner*—Jacob Shapiro
*Attorney, Agent, or Firm*—M. Howard Silverstein; David G. McConnell

[57] ABSTRACT

This invention provides an all-wooden culvert shaped as an equilateral triangle in which the three sides are joined solely by interlocking of the structural members in notches in each member. All sides are composed of a series of identical members which feature facilitates member fabrication and allows for culvert installation by unskilled labor.

2 Claims, 6 Drawing Figures

DELTA CULVERT

BACKGROUND OF THE INVENTION

1. Field of the Invention

This invention relates to a culvert composed entirely of identical wooden members which culvert can be used for conveying water under road surfaces and other obstacles. The exclusive use of wood makes this invention particularly applicable to areas in which corrosive elements severely reduce the life of metal culverts, to areas in which access is difficult and limited, and in situations where the culvert use is temporary or where changes in road width or location are expected. Additionally, the unique design of this culvert permits ready changes in culvert length and salvage without damage.

2. Prior Art

Wooden culverts have been used in many situations where other types were impractical because of local conditions or expense. In areas where soils are acid or where there is a highly corrosive runoff, as in mining areas, corrugated steel pipe corrodes in ten years or less and must be replaced. In similar situations properly treated wooden culverts have demonstrated an ability to resist decay for 50 years and more and they are not corroded by acid conditions. Concrete culverts are often impractical for temporary or secondary roads or where changes in road width or location are expected. Wooden culverts have wide use in these situations because their initial cost is lower than that of other types and they can be more easily removed.

Wooden culverts with different configurations and different methods of construction have been in use for years. U.S. Pat. No. 221,439, issued to J. H. Blose, Nov. 11, 1879, shows a triangular figure with an open bottom. U.S. Pat. No. 445,994, issued to William Dale Harris, Feb. 10, 1891, shows a culvert with vertical sides topped by a gable-type roof. U.S. Pat. No. 903,572, issued to Willard Houghton, Nov. 10, 1908, shows a triangular culvert for installation flush with a road surface in which culvert are slots at the top to drain road water into the culvert. A common culvert in present use is a 2-foot square box culvert utilizing 3-inch thick lumber.

All of these types of wooden culverts require the use of parts of at least two different lengths, widths, and/or thicknesses and each part must be made with different notches or drilled holes. Thus in construction of the culvert, the pieces are noninterchangeable and must be placed in certain specific positions; additional time and care must be taken to align holes and notches properly for the acceptance of fasteners. All of these previous wooden culverts depend on nails, spikes, bolts or some other type fastening devices for maintaining their integrity. Thus their integrity is determined by the strength of the wood to resist tearing by the fastening device. Additionally, removal and/or disassembly of these type culverts is difficult to accomplish without damage to the components.

It is a primary object of this invention to eliminate the problems inherent in previous designs that require multiple types of pieces and fasteners. Another object of this invention is to provide a wooden culvert whose members can be fabricated with a minimum amount of difficulty and labor. A further object is to provide a wooden culvert that can be easily assembled and disassembled, shortened or lengthened, with no damage to the structural members. A further object is to produce a culvert more economically than can presently be done.

Other objectives and advantages of this invention will become apparent as it is described more fully.

The delta culvert is distinguishable from previous designs in several respects. The primary such distinguishing features are the design of the interlocking joints at the three vertices and the accompanying advantages of this joint design. The geometry of the joint is such that when load is applied in any direction to the outer walls of the culvert, the joints develop the full strength of the wood members. When load is applied, the joints seat firmly and all joint interfaces bear the load. Before the culvert can collapse from a load, the sides must hinge at the top vertex and spread laterally away from the base vertices. However, the joint used prevents such action in two ways:

1. the opposing faces of the joint at the top vertex are in direct opposition to hinging;
2. the sides cannot disengage or move laterally away from the base unless one-half of the base members fail due to horizontal shear, but this is unlikely because the remaining base members would have to fail due to crushing before the full strain would be borne in horizontal shear. Thus, the delta culvert will not rack or collapse until the strength of all the base members is exceeded or until the sides reach breaking strength.

Use of this interlocking joint makes the delta culvert unique because similar structures are dependent on nails, spikes, bolts or other fastening devices for joint strength.

The delta culvert is also unique in that it is composed entirely of a series of identical wooden members prefabricated into a wall section rather than being made of several members of varying dimensions and construction. The design gives a fully interlocking joint system with the use of one simple, identical notch in each member. This feature facilitates mass production of the members.

The delta culvert differs from the design of Blose, Harris, and Houghton in that all three sides of the culvert are mated in a continuous series of interlocking joints. The delta culvert differs from those of Blose and Harris by having a base which is an integral part of the structure. More specifically, the design of Blose is limited in strengh by the nail withdrawal resistance or split resistance as at $a''$ in FIG. 2 of Blose's patent while the base of the delta culvert is capable of developing the full strength of the wood members with no fasteners. Further, the delta culvert has a confined area for water passage while the Blose pipe is open along the bottom. The sections of the delta culvert are joined so that a joint between sections occurs on only one wall at any point and no fasteners are necessary. By contrast, the Blose pipe consists of horizontal planks held by frames at certain intervals, and sections are joined to succeeding sections by using fasteners at a joint common to the two walls.

The delta culvert differs substantially from the design of Harris in other ways than those mentioned above. The base of the delta culvert is an integral structural part of the design that prevents the walls from spreading. The design of Harris has no integral structural base and depends on the resistance of the soil to maintain the walls in a vertical attitude. While soil bearing on the delta culvert adds additional rigidity, the primary strength of the delta culvert derives from the integral base which is locked to the sides making the structure rigid and rack resistant even if free standing. Since the delta culvert has no fasteners, the culvert may be easily assembled or disassembled, but the Harris culvert is composed of sections one member wide without locking joints and sections must be lined up and bolted together to form a continuous system.

The delta culvert differs from the design of Houghton by having fully interlocking joints where the Houghton culvert simply has the side walls resting atop the base and secured in position by spikes; the joints of the Houghton culvert are in no way interlocking and depend on the securing spikes for structural integrity. Lengths beyond the length of one section must be secured to the succeeding section at a common wall joint with a fastener of some type while the delta culvert can be extended for any desired length without the use of fasteners at any wall joint.

SUMMARY OF THE INVENTION

The details of the delta culvert are set forth in the following paragraphs with reference to the accompanying drawings. The particular dimensions used in the description and drawings are convenient examples of this invention and are not, nor intended to be, exclusive. Members of other dimensions can be used if desired with similar results and advantages.

Figure 1:
FIG. 1 shows a top view of the basic member from which the delta culvert is constructed.
Figure 2:
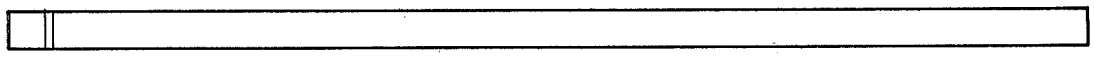
FIG. 2 shows a side view of the same member.

The basic member of the delta culvert is shaped as an elongated right parallelepiped with a square cross section, a width of 1 13/32 inches, and a length of 39 11/64 inches. On one end a 90° notch, 1 13/32 inches wide, is formed by making an angle cut beginning at the intersection of the end and a contiguous face (hereinafter referred to as the end and the face, respectively) which cut is 30° relative to the face and which cut extends a distance of 1 27/128 inches, this distance being measured from the end parallel to the face, at which point the first cut makes perpendicular contact with a second angle cut beginning on the face 1 79/128 inches from the end, which second cut is 60° relative to the face and extends 13/32 inch toward the end when measured parallel to the face beginning at the origin of the second cut. As illustrated in FIGS. 1 and 2, this one notch is the only alteration required on the basic member.

Figure 3:
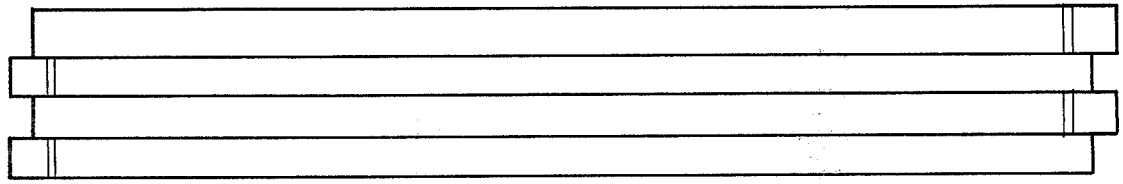
FIGS. 3, 4 and 5 show side views of members laminated into sections consisting of 4, 8, and 12 member, respectively.
Figure 4:
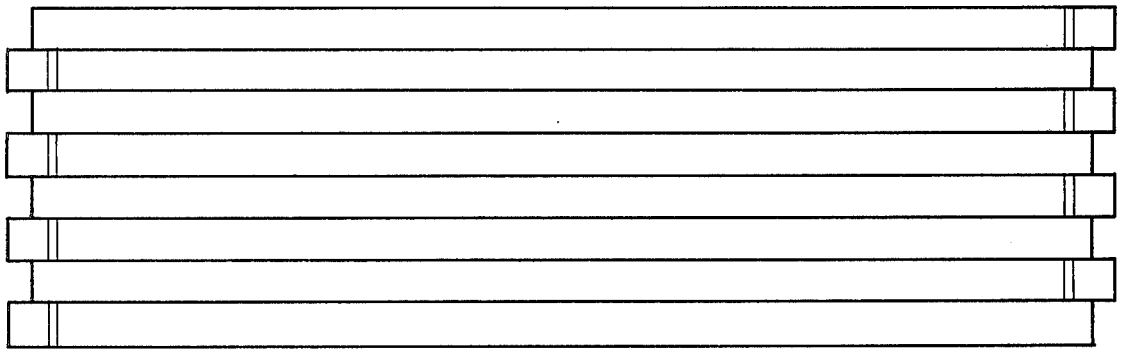
Figure 5:
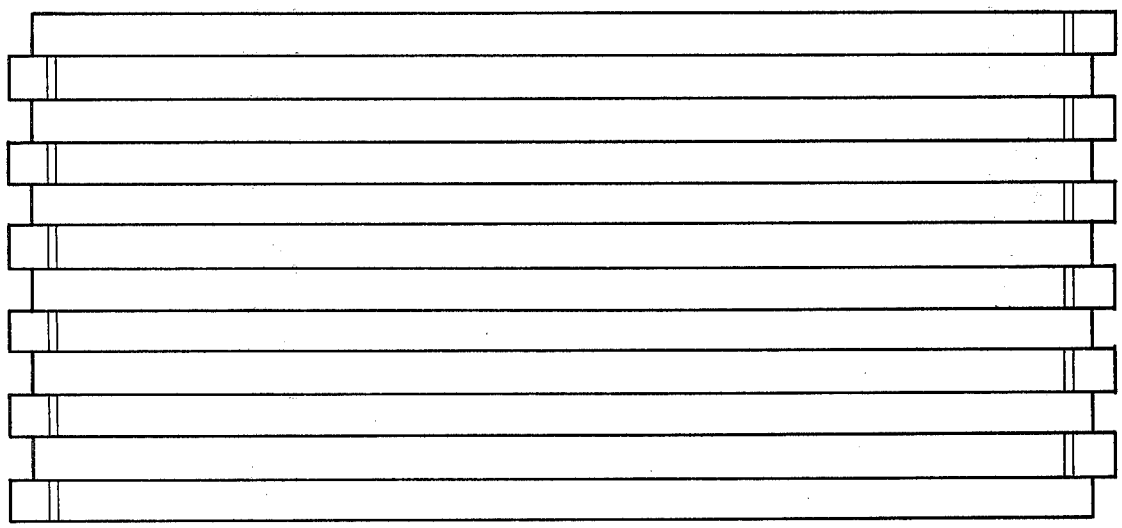

The milled members are then glue laminated into sections consisting of 4, 8, or 12 members, FIGS. 3, 4, and 5 respectively. The desired number of members are positioned as illustrated in FIGS. 3, 4, and 5 with notched ends alternating with square ends and notched ends extending beyond the adjacent square ends a distance of 103/128 inch. The members are bonded into these positions by a waterproof, cold-setting, resorcinol-resin adhesive or equivalent applied to the pieces before positioning. Positioning of the members can be done in a jig equipped with stops to properly position each member, and clamping pressure for bonding can be applied by manually or mechanically operated jacks. The process for positioning, the manner of applying pressure for bonding, and the bonding agent described are intended merely as satisfactory examples and are by no means intended to be exclusive methods for achieving their particular purpose.

After the sections are completed, they are treated with preservatives to conform to the particular requirements of the state highway engineers of the state in which they will be used. Treating may be accomplished by pressure treatment or any other satisfactory method.

Figure 6:
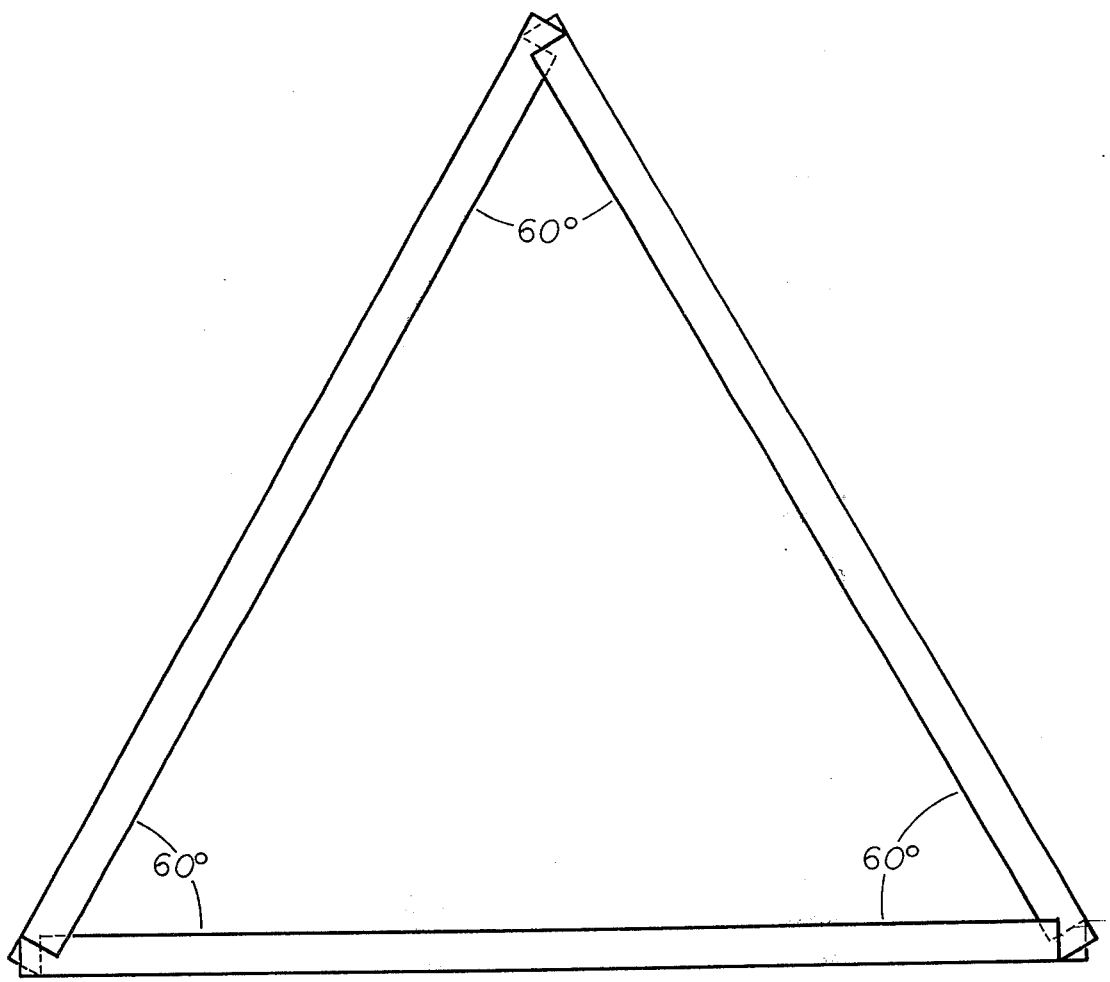
FIG. 6 shows an end elevation of the finished calvert with the joints fitted.

Delta culverts can be readily installed by unskilled workmen on a standard culvert subgrade. The bottom is laid first using 12-member sections exclusively for the entire length of the culvert with the sections laid flat and adjacent to each other with notched sides up and the members lying perpendicular to the centerline of the culvert bed. The sides are then erected beginning at one end of the base on one side with a 4-member section and on the opposite side with an 8-member section. In each case the notched ends of the side are fitted with the square ends of the bottom and the square ends of each side are fitted with the notched ends of the bottom. The two canted sides are then interlocked at the top with the notched ends of one side fitted with the square ends of the other single the square ends of the one fitted with the notched ends of the other. At all vertices the firm seating of the ends as described is the only joining device required or used. The culvert is extended by positioning 12-member sections on each side in the manner described above until there is one less 12-member section on each side than was used to construct the bottom. The sides are finished by using an 8-member section on the side that began with a 4-member section and using a 4-member section on the side that began with an 8-member section. FIG. 6 shows an end elevation of the finished culvert with the joints fitted.

The finished structure thus has a bottom composed entirely of 12-member sections and two sides, each composed of a single 4-member section, a single 8-member section, and at least one 12-member section, the number of such 12-member sections dependent only on the length culvert desired.

The unique method of fabrication and construction of this culvert produces a triangular culvert which is rigid, completely enclosed, requires no bolting or fastening devices between sides or between sections in a side, in which all joints between sides will be completely interlocking, and in which joints between sections in a side will never join an adjacent side at a joint between sections in that side. As explained earlier, for the delta culvert to fail, half its base members must fail due to horizontal shear after the other half of the base members have failed due to crushing. Thus the delta culvert develops the full strength of the wooden members rather than just the resistance to tearing of a fastener as in most present designs. The design of the delta culvert makes it simple for unskilled labor to assemble, lengthen, shorten, or disassemble without damage to the components, which feature is a decided advantage over present designs that require fasteners of some type.

Although the delta culvert uses a road subgrade similar to other culverts, its interlocking design gives it a much higher resistance to racking and collapse where the subgrade soil subjects the culvert to unequal loading due to unequal compaction of the subgrade soil or where the unequal loading is due to traffic.

Another benefit resulting from the design is that 6/4-inch stock may be used as the basic member rather than the 3-inch stock commonly used with present designs. The thinner stock is cheaper, more readily available, easier to handle, and easier to dry without excessive deterioration in quality than 3-inch stock. The thinner stock can be dried from green to air dry in about ¼ the time required to similarly dry 3-inch lumber. A major advantage of the delta culvert over other designs is that a 12-member section can be readily handled by one man. This feature permits the installation of the delta culvert without the use of mechanical equipment; this is of particular importance in areas where equipment cannot be moved or positioned readily and it also frees equipment for other tasks.

Compared to wooden culverts of conventional design, the delta culvert is readily distinguishable by its unique interlocking joints that obviate the need for fasteners of any type and permit easy assembly, modification, and/or disassembly of the structure by unskilled workers without damage to the structural components; its use of a single type of structural member rather than multiple configurations; and its use of raw material that is smaller and thus less expensive, easier to handle and easier to dry.

Having described my invention, I claim:

1. The constructional wall section of a tubular article in the form of a three-sided culvert, the said wall section fabricated by bonding together with a waterproof, cold setting, resorcinol-resin adhesive, a plurality of individual structural components, each of said structural components defined individually as an elongated member shaped as a regular right parallelipiped with square cross section; said member notched at one end only with a face width notch formed by two intersecting cuts, to wit, a first cut beginning at the edge intersection of an end and a face of the member and extending into the member, at an angle of thirty degrees relative the face plane of the member, for a distance sufficient to completely accept the unnotched end of a counterpart structural component member, the notch subsequently completed with a second cut perpendicular said first cut and extending from the bottom of the said first cut to the aforementioned member face with which face the plane of the said second cut will exhibit an angle of sixty degrees, all components with notched faces in the same plane, all adjacent components with notched ends and unnotched ends alternating, and all components with notched ends uniformly extending beyond adjacent component unnotched ends a distance substantially one-half the face width of a component, the term plurality for claim purposes in this application being restricted numerically to even whole numbers thereby to produce 3 separate constructional wall section groups, the groups namely a first group of at least two units composed of an even number of structural components, a second group of at least two units composed of structural components double in number the components of the first group and a third group composed of structural components triple in number the components of the first group.

2. A tubular article in the form of a three-sided culvert, said article constructed according to the following sequential scheme:
   a. laying a sufficient plurality of the third group wall sections of claim 1 side by side and with notches facing upward to match the desired length of the finished culvert, thereby to form a culvert base wall;
   b. interlocking a first group wall section of claim 1 with one side of one end of the base wall formed in step a., thereby to form a culvert first side wall;
   c. interlocking a second group wall section of claim 1 with the opposite side of the base wall of step a. at the same end of the base wall involved in step b., thereby to form a culvert second side wall;
   d. interlocking the uninvolved ends of the opposing first group and second group wall sections thereby to form a joint which is the top vortex of the three-sided culvert;
   e. interlocking third group wall sections in the manner described in steps b., c., and d. above, thereby to extend the culvert first side wall and the culvert second side wall until each of said first and second side wall contains one less third group wall section than does the culvert base wall;
   f. interlocking in the manner described in steps b., c., and d. above a second group wall section on the said first side wall as distinguished in step b. above and interlocking a first group wall section on the said second side wall as distinguished in step c. above, thereby to complete the three-sided culvert.

* * * * *